United States Patent
Garst, Jr.

(10) Patent No.: US 8,504,596 B2
(45) Date of Patent: Aug. 6, 2013

(54) EXTENDED GARBAGE COLLECTION

(75) Inventor: Gerald Blaine Garst, Jr., Los Altos, CA (US)

(73) Assignee: Apple Inc., Cupertino, CA (US)

( * ) Notice: Subject to any disclaimer, the term of this patent is extended or adjusted under 35 U.S.C. 154(b) by 222 days.

(21) Appl. No.: 11/881,055

(22) Filed: Jul. 25, 2007

(65) Prior Publication Data

US 2009/0030958 A1 Jan. 29, 2009

(51) Int. Cl.
*G06F 12/00* (2006.01)
*G06F 17/30* (2006.01)

(52) U.S. Cl.
USPC .......................................... 707/814

(58) Field of Classification Search
USPC ............... 707/206, 999.206, 812, 813, 814, 707/818
See application file for complete search history.

(56) References Cited

U.S. PATENT DOCUMENTS

| | | | | |
|---|---|---|---|---|
| 5,241,673 A * | 8/1993 | Schelvis | | 1/1 |
| 5,960,087 A * | 9/1999 | Tribble et al. | | 713/167 |
| 6,226,653 B1 * | 5/2001 | Alpern et al. | | 1/1 |
| 6,598,094 B1 * | 7/2003 | Wollrath et al. | | 719/330 |
| 6,629,154 B1 * | 9/2003 | Jones et al. | | 719/330 |
| 6,647,547 B1 * | 11/2003 | Kanamaru et al. | | 717/151 |
| 6,671,707 B1 * | 12/2003 | Hudson et al. | | 1/1 |
| 6,826,583 B1 * | 11/2004 | Flood et al. | | 1/1 |
| 6,845,385 B1 * | 1/2005 | Hennessey | | 1/1 |
| 6,957,237 B1 * | 10/2005 | Traversat et al. | | 1/1 |
| 6,994,637 B2 | 2/2006 | Murphy et al. | | |
| 7,115,919 B2 * | 10/2006 | Kodama | | 257/201 |
| 7,305,538 B2 * | 12/2007 | Garst et al. | | 711/170 |
| 7,308,466 B2 * | 12/2007 | Houldsworth | | 1/1 |
| 7,428,560 B1 * | 9/2008 | Detlefs et al. | | 1/1 |
| 7,788,300 B2 * | 8/2010 | Kuck et al. | | 707/813 |
| 7,904,493 B2 * | 3/2011 | Schmelter et al. | | 707/820 |
| 2002/0019716 A1 | 2/2002 | Agesen et al. | | |
| 2002/0095453 A1 * | 7/2002 | Steensgaard | | 709/107 |
| 2002/0166116 A1 * | 11/2002 | Eidt | | 717/152 |
| 2003/0191783 A1 * | 10/2003 | Wolczko et al. | | 707/206 |
| 2004/0111451 A1 * | 6/2004 | Garthwaite | | 707/206 |
| 2006/0059453 A1 | 3/2006 | Kuck et al. | | |
| 2006/0155943 A1 * | 7/2006 | Todd et al. | | 711/161 |
| 2006/0248131 A1 | 11/2006 | Marwinski et al. | | |
| 2007/0130238 A1 | 6/2007 | Harris et al. | | |

(Continued)

OTHER PUBLICATIONS

Hertz et al. Error-Free Garbage Collection Traces: How to Cheat and Not Get Caught. 2002. http://www-cs.canisius.edu/~hertzm/merlin-sigmetrics-2002.pdf.

Hans-J. Boehm. Fast Multiprocessor Memory Allocation and Garbage Collection. Dec. 8, 2000. Internet and Mobile Systems Laboratory HP Laboratories Palo Alto.

*Primary Examiner* — Cheryl Lewis
*Assistant Examiner* — Mark E Hershley
(74) *Attorney, Agent, or Firm* — Womble Carlyle Sandridge & Rice LLP

(57) ABSTRACT

Extended garbage collection is disclosed. It is determined, based at least in part on data stored in a data structure accessible to the respective garbage collecting entity of each of a plurality of runtime systems, that a local object is associated with one or more external objects. The local object is retained, even if the local object has been determine to be unreachable locally in a local runtime system with which the local object is associated, if at least one of said one or more external objects has been determined to be reachable within an external runtime environment with which the at least one external object is associated.

22 Claims, 8 Drawing Sheets

U.S. PATENT DOCUMENTS

2007/0203960 A1* 8/2007 Guo .............................. 707/206
2007/0208790 A1* 9/2007 Reuter et al. .................. 707/206
2008/0028153 A1* 1/2008 Marwinski .................... 711/130
2008/0140737 A1 6/2008 Garst et al.

* cited by examiner

EXTENDED GARBAGE COLLECTION

BACKGROUND OF THE INVENTION

Garbage collection is a technique used to manage in an automated fashion memory blocks that have been allocated for use by programs using objects associated with a runtime system, without requiring that the programs themselves or other application code with which such memory blocks are associated keep track of and when finished de-allocate said memory blocks. One use for such memory is as the contents of an "Object". Blocks that are roots (e.g., stack local variables and global variables and those registered as being held externally) and/or that are reachable from a root block via a chain of one or more explicit or "strong" references are kept alive, while blocks that are no longer reachable, indicating they are no longer in use (i.e., referenced by) by any live object, are "garbage collected", that is, de-allocated and returned to the runtime system, thus making available for other use the memory allocated previously to such objects. Providing a "garbage collected" runtime system simplifies the task of application developers and avoids problems, such as "memory leaks", crashes due to stale references to prematurely de-allocated blocks, and other related failures, that can occur if memory resources allocated to application objects are not released when and only when such objects are no longer in use.

In at least some distributed environments, such as network environments or where multiple runtime systems share a memory address space within a single computer system, it is possible for an object in one system to have external references to objects in other runtime and/or physical systems. Such external references are considered to be part of the "root" set, such that objects to which such external references are made and any object reachable from such an externally referenced object, are kept alive. FIG. 1A illustrates an example of an environment in which multiple runtime systems are present within an address space. The address space 102 may include, for example, an address space within a computer system's memory. A corresponding memory "heap" comprising a portion of address space 102 has been assigned to the sole use of runtime systems 104, 106, 108, and 110, respectively. Examples of such runtime systems include JavaScript, Java, and Objective C runtime systems, and runtime systems associated with other scripting and/or programming languages, such as Python, Ruby, Perl, and Smalltalk. Typically, each such runtime environment would have its own garbage collector responsible for identifying and reclaiming memory associated with unused objects.

FIG. 1B illustrates examples of external references to objects in other runtime systems. In the example shown, an object 140 in runtime system 104 has an external reference to an object 142 in runtime system 106, the external reference being represented in FIG. 1B by the black arrow running between objects 140 and 142. Similarly, object 142 in runtime system 106 has an external reference to object 146 in runtime system 110, which in turn has an external reference to object 144 in runtime system 108, which in turn has an external reference to object 140 in runtime system 104, thereby completing a loop of external references among the objects 140-144.

In the typical prior art approach, a garbage collector is configured to keep alive a local object that is not reachable locally but to which an external reference is present, and to only garbage collect such an object once the external reference has been removed and/or it is determined that the referring object is no longer present. FIG. 2 illustrates an example of how a typical prior art garbage collector handles external references. If an object is not reachable locally (202), it is kept alive (208) if an external reference to the object exists (204); otherwise, i.e., if there is no external reference to the object, it is garbage collected (i.e., associated memory de-allocated) (206). However, the typical approach can result in objects that make references to one another, such as in the example shown in FIG. 1B, from being garbage collected. Each is kept alive by the local garbage collector of its local runtime environment due to the presence of an external reference from at least one external object that is still present in that external object's own runtime system, which results in the objects keeping each other alive, each in its respective runtime system, even though none of the objects are needed or in use.

Therefore, there is a need for a way to manage memory more effectively in a multiple runtime system environment.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In some embodiments, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Garbage collection in a distributed environment is disclosed. In some embodiments, data associating together a set of objects, each in a corresponding runtime environment, and indicating for each whether it has been determined to be reachable within its own local runtime system or is otherwise in use, such that it and the other objects with which the data indicates it is associated, should be kept alive. In some embodiments, the respective garbage collector in each runtime environment is configured, modified, and/or extended to ensure that an object is kept alive, even after it is no longer reachable in the local runtime system, if it is determined based at least in part on data stored in a data structure accessible to the respective garbage collectors of the runtime systems to be associated with one or more other objects in each of one or more other runtime systems and at least one of the objects with which it is associated has been determined to be reachable within its local runtime system or otherwise in use, as indicated by data stored in said data structure.

Figure 1A:
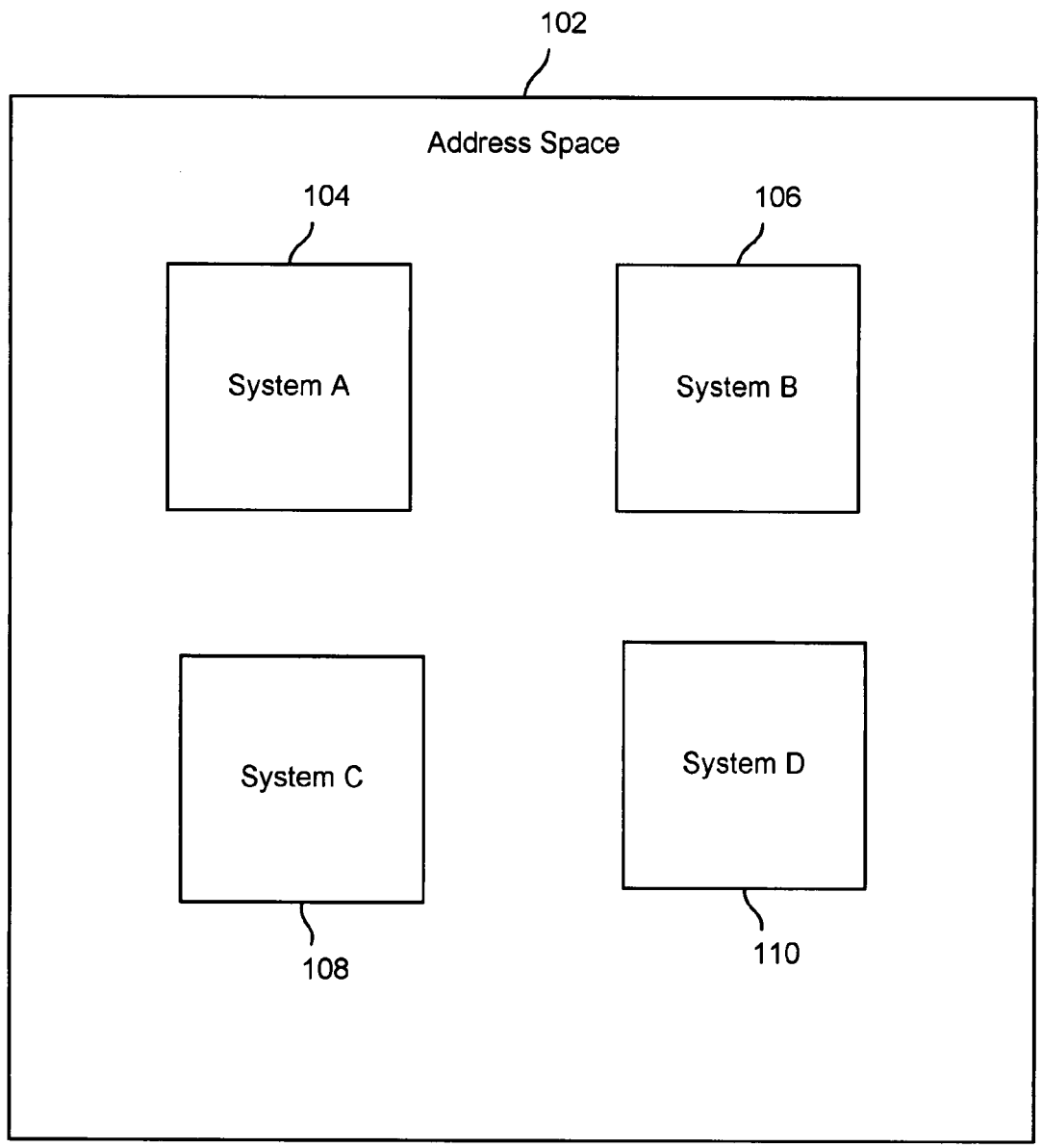
FIG. 1A illustrates an example of an environment in which multiple runtime systems are present within an address space.
Figure 1B:
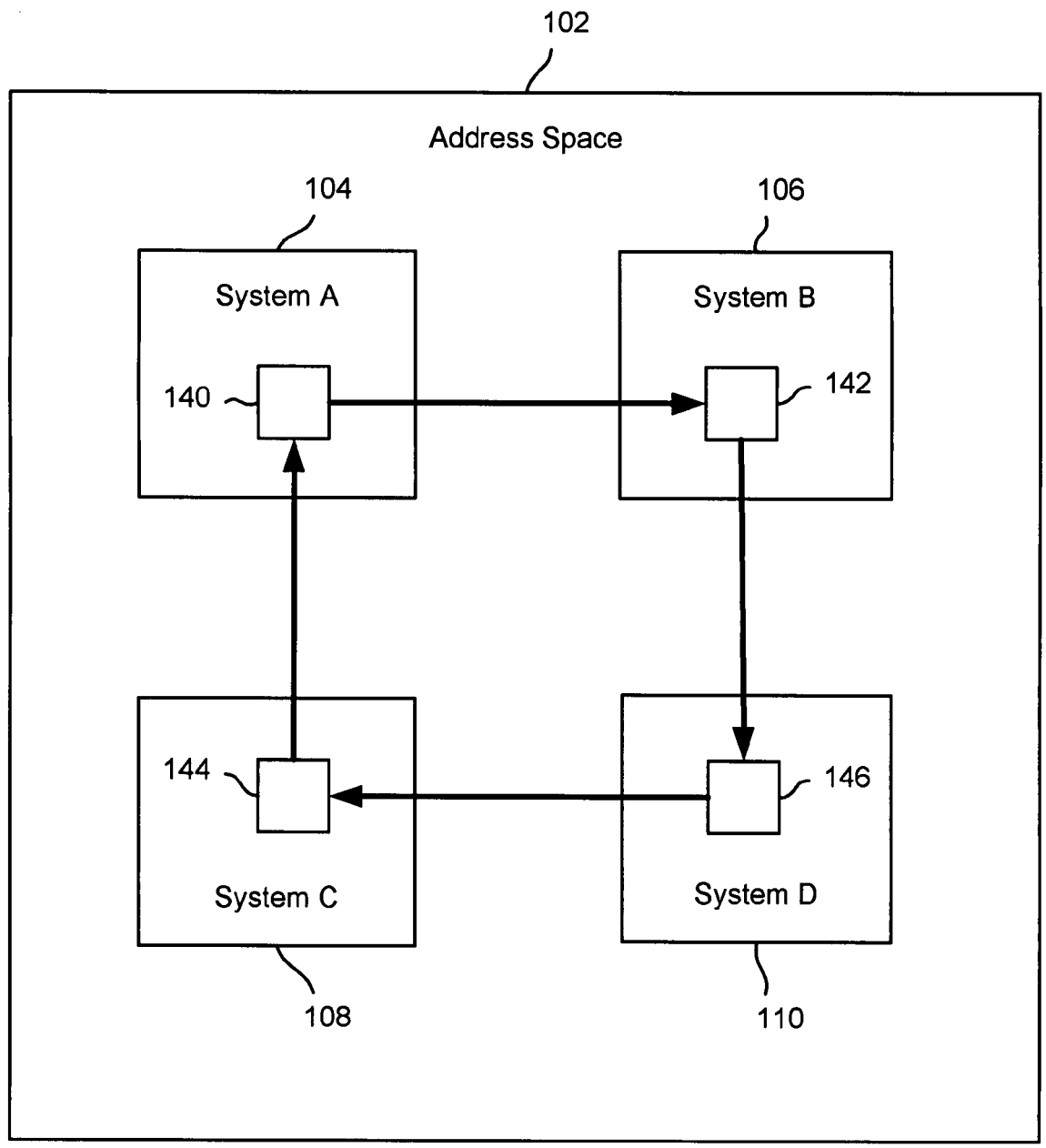
FIG. 1B illustrates examples of external references to objects in other runtime systems.
Figure 2:
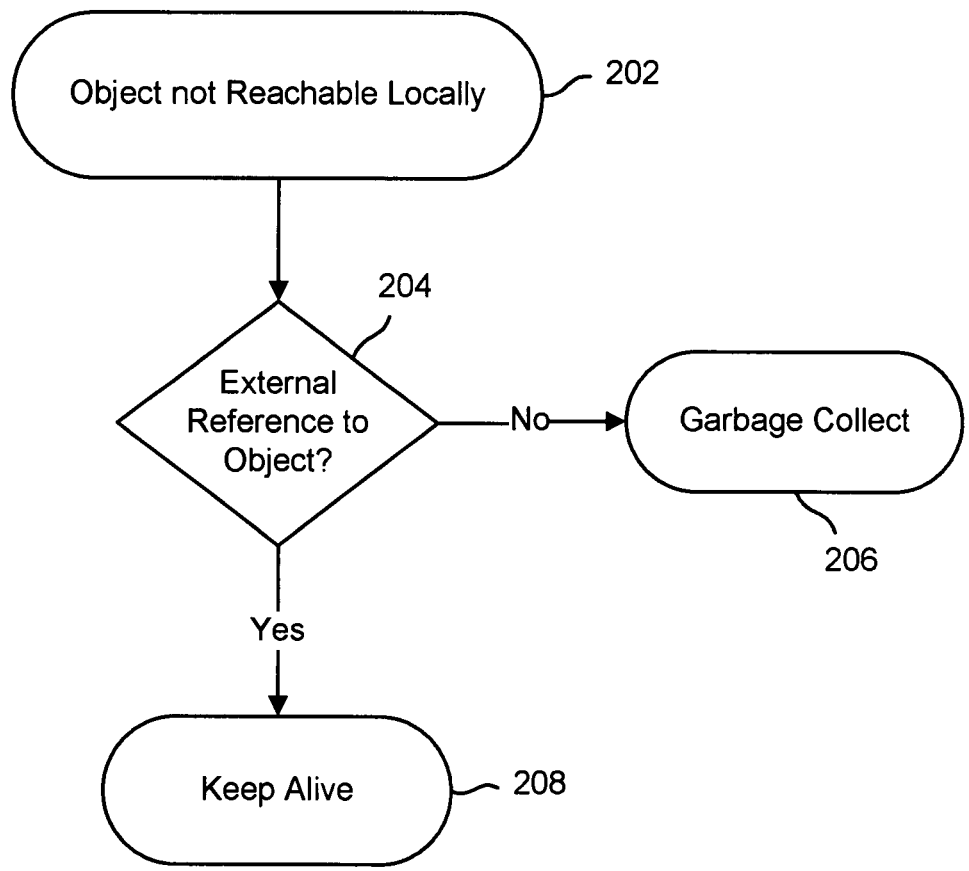
FIG. 2 illustrates an example of how a typical prior art garbage collector handles external references.
Figure 3:
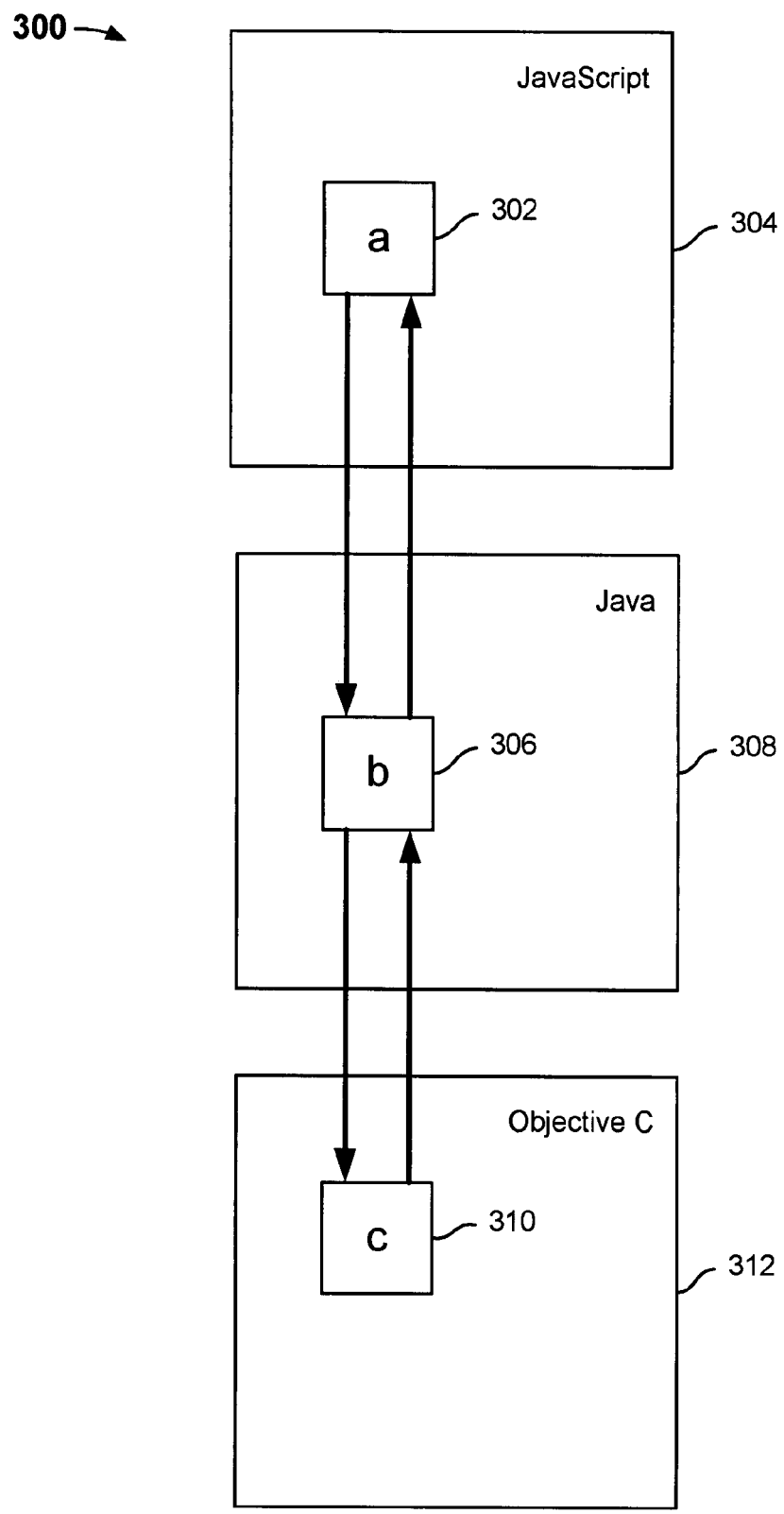
FIG. 3 is illustrates an embodiment of a system for distributed garbage collection.

FIG. 3 illustrates an embodiment of a system for distributed garbage collection. In the example shown, a distributed environment 300 includes a JavaScript runtime system 304, a Java runtime system 308, and an Objective C runtime system 312. In this example, each of the runtime systems 304, 308, and 312 is a garbage collected runtime system. A distributed object comprising a first component object 302 in JavaScript runtime system 304, a second component object 306 in Java runtime system 308 and a third component object 310 in Objective C runtime system 312, is shown. For example, JavaScript object 302 may invoke a subview object 306 in Java runtime system 308, which in turn may use a view object 310 in Objective C runtime environment 312. In some cases, the "distributed" parts of a distributed object such as the one shown in FIG. 3 only act as proxies with no extra storage or behavior, as is true within lessor dynamic languages such as Java and Objective-C; however, it is possible to extend data and behavior as was done, for example, with the Java-Objective C Bridge (NeXTSTEP ~1996). One use of distributed objects may be to enable an application developer to program in a relatively uncomplicated scripting language such as JavaScript and yet make use of more powerful and/or efficient Java and/or Objective C code developed previously by other programmers with knowledge about how to program in those more powerful and more complicated programming languages.

In addition to making more powerful code available to less sophisticated developers, such an approach facilitates the reuse and/or extension of already existing and still useful code. In the example shown, objects 302 and 306 are associated with one another and objects and objects 306 and 310 are associated with one another, as indicated by the arrows shown between them in FIG. 3. If the arrows represented traditional external references, that may result in a cycle that would prevent the component objects 302, 306, and 310 from being garbage collected even after all three were no longer in use, as described above.

A "garbage collector" comprises a component or set of components and associated processes that run in a runtime system and perform garbage collection with respect to objects stored in the runtime system, e.g., those associated with applications running in the runtime system, typically according to a garbage collection algorithm. In some embodiments, the respective garbage collectors of the runtime systems 304, 308, and 312 are configured, as described more fully below, to keep alive a local object that is not reachable locally but that is associated with one or more external objects (i.e., objects in a runtime system other than the local runtime system with which that particular garbage collector is associated) by data stored in a data structure accessible to the respective garbage collectors of the respective runtime systems. In some embodiments, a plug in, API, or other architecture and/or interface is used to extend and/or modify an OEM or other vendor provided garbage collector to implement the distributed garbage collection techniques described herein.

In some embodiments, so long as at least one of the component objects 302, 306, and 310 remains reachable in its local runtime system and/or is determined to be otherwise in use, each of the three component objects 302, 306, and 310 is kept alive by the garbage collector in its local runtime environment, even if the object is not reachable or otherwise in use within that local runtime environment. All other objects reachable from that object are themselves also considered reachable, including those that might also be in the mild reference table with no other reachable counterparts. The logic of cooperating garbage collectors has to be extended to include all objects reachable from mild references found to have counterparts reachable in their own domain. In some embodiments such retention is achieved not through a traditional external reference, which can result in uncollectible cycles as described above, but instead by configuring the respective garbage collectors to update data stored in a location known to and accessible by each of them, and to retain locally unreachable objects that remain in use externally as indicated by data stored in such a location. In some embodiments, the data is stored in a "mild" reference table. For example, a first object in a first runtime environment that wishes to have instantiated and use a second objects in a second runtime environment in some embodiments is configured (or associated application code is configured) to invoke a method or function of the garbage collector in the first runtime system to set a "mild" reference to the second object, which results in some embodiments in the first garbage collector making in a mild reference table or other data structure an entry or set of entries that associated the first and second objects together. The respective garbage collectors of the first and second runtime systems, respectively, are configured to update in the table or other data structure data indicating whether the object in its local runtime system is reachable and/or otherwise in use. Prior to deallocating (reclaiming) an object, the respective garbage collector checks the data structure for any entries applicable to the object and retains the object, even if it is not otherwise reachable (including by any traditional external reference), so long as at least one external object with which it is associated by data stored in such a data structure is indicated by data stored in the data structure to have been determined to be reachable or otherwise in use by the garbage collector in the external runtime system with which such external object is associated.

Figure 4:
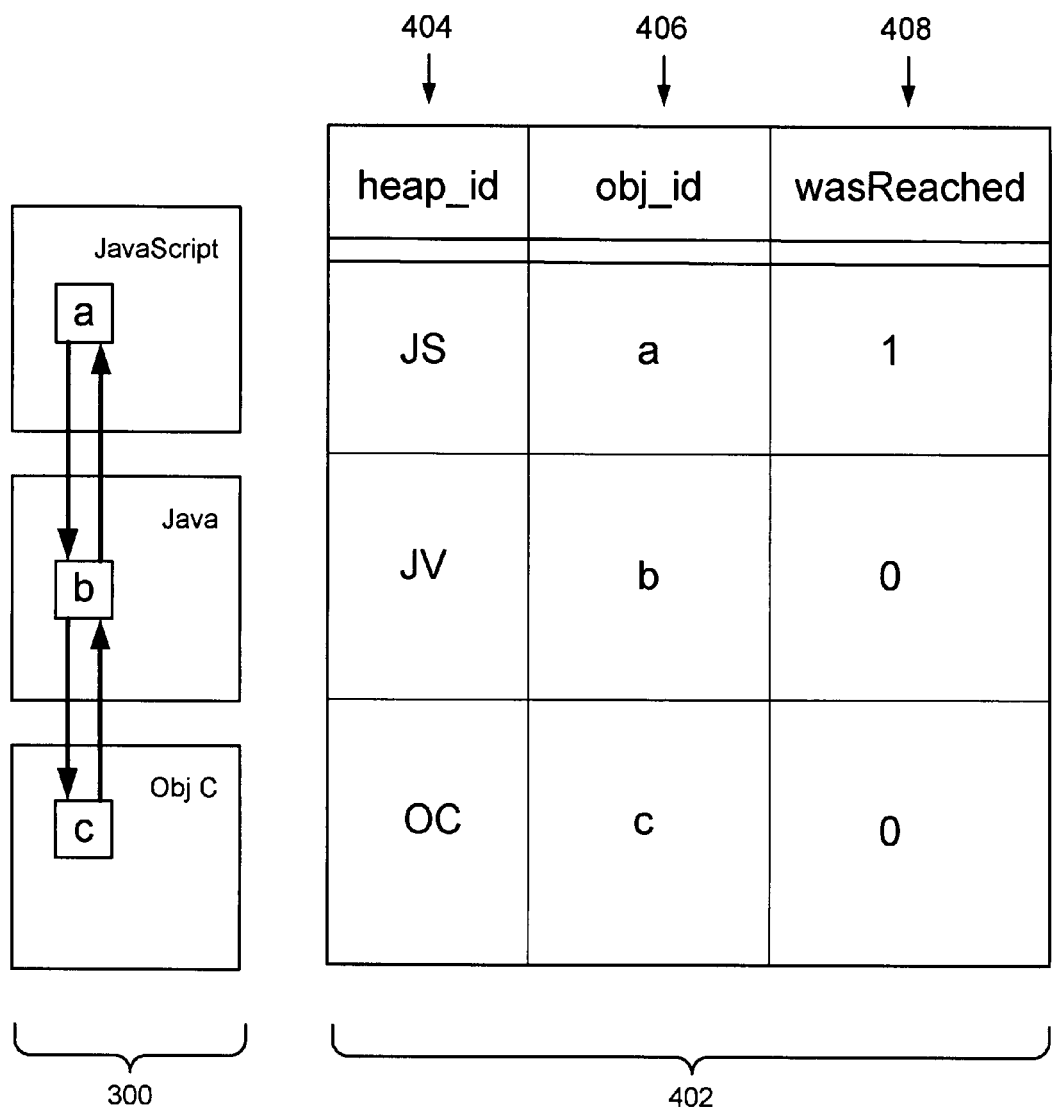
FIG. 4 is a block diagram illustrating an embodiment of a data structure for implementing distributed garbage collection.

FIG. 4 is a block diagram illustrating an embodiment of a data structure for implementing distributed garbage collection. In the example shown, the elements comprising distributed environment 300 of FIG. 3 are shown adjacent a mild reference table 402 configured and used to store data associating together the component objects 302, 306, and 310 of the distributed object shown in FIG. 3. The table 402 includes a first column 404 in which data identifying the memory "heap" (i.e., the runtime system) with which each respective object (i.e., row) is associated, a second column 406 in which an identifier by which each respective object is known in its local runtime system is stored, and a third column 408 in which data (in this example a single bit) indicating for each object whether it has been determined to be reachable in its local runtime system and/or otherwise in use. In the example shown, the JavaScript object has been marked, e.g., by the garbage collector of the JavaScript runtime system, to have been determined to be reachable or otherwise in use, while the Java and Objective C objects have been determined to not be reachable within their respective local runtime systems. In some embodiments, the fact that the Java object has been marked as being reachable or otherwise in use would have the effect of causing the Java runtime system garbage collector retain the Java object and the Objective C runtime system garbage collector retain the Objective C object, even though those objects are no longer reachable within their respective local runtime systems. For example, prior to de-allocating (reclaiming) the Java object, the Java runtime system garbage collector would check for mild reference table entries indicating the Java object may be in use externally. Upon finding the entry in the table 402, the Java garbage collector would determine that at least one external object with which the otherwise not reachable Java object is associated, in this example the JavaScript object, has been marked as reachable within its own local runtime system (or otherwise in use). As a result, the Java garbage collector would retain the Java object, for example by marking it locally to be alive or in use, even though it is not reachable locally (or in some embodiments referenced by a traditional external reference).

Figure 5:
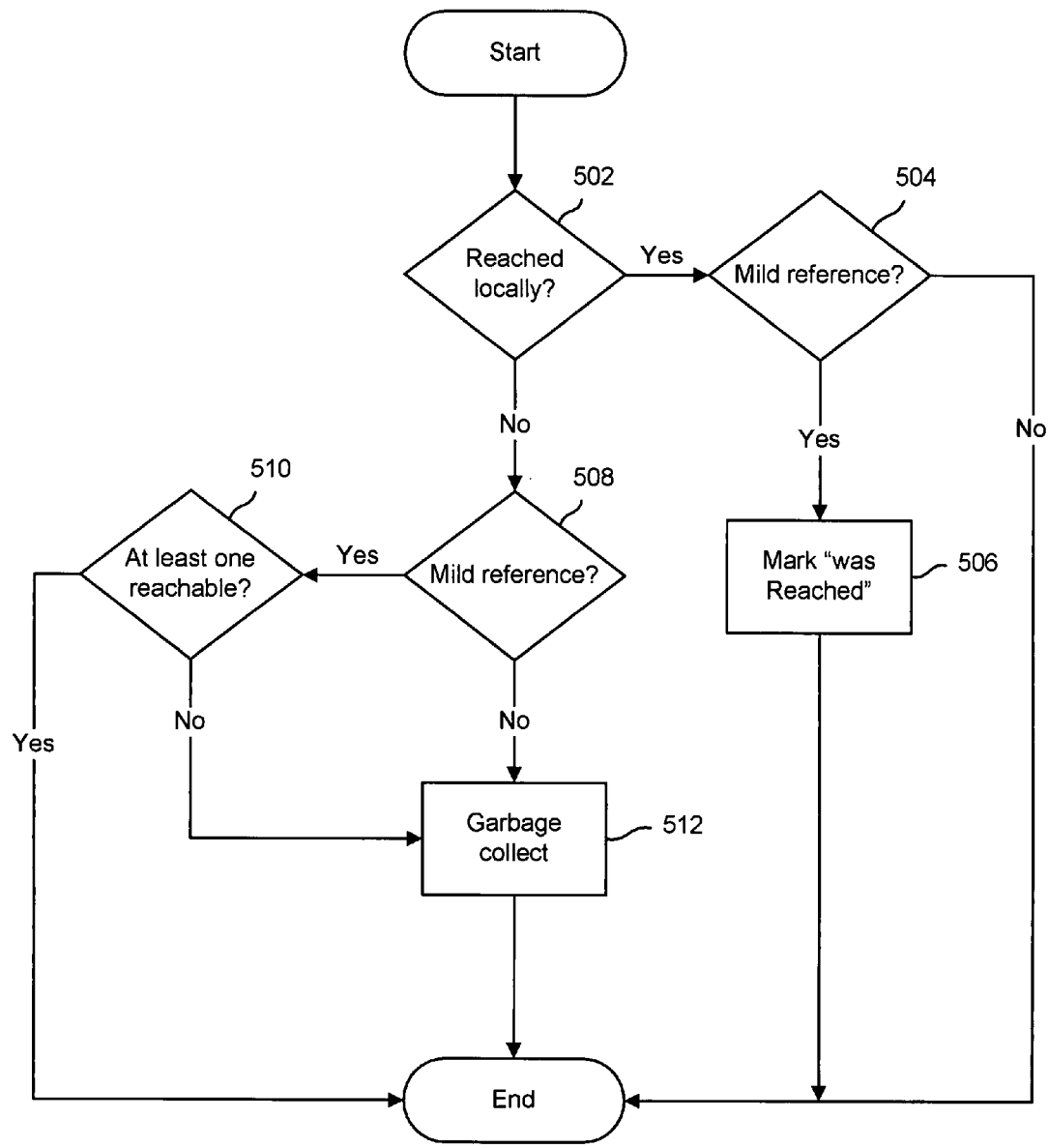
FIG. 5 is a flow chart illustrating an embodiment of a process for extended garbage collection.

FIG. 5 is a flow chart illustrating an embodiment of a process for extended garbage collection. In some embodiments, the process of FIG. 5 is implemented by each of one or more garbage collectors each associated with a respective runtime system. In the example shown, if an object has been determined to be reachable locally (502), it is determined whether it is associated with one or more external objects by a "mild" reference (504). In some embodiments, the determination whether an object is associated with one or more external objects (504) includes checking one or more tables such as table 402 of FIG. 4 for entries associated with the object. If the object is associated with one or more external objects by a "mild" reference (504), it is marked in a corresponding entry associated with such external use, e.g., a table such as table 402 of FIG. 4, as having been determined to be reachable within its local runtime system (506). If the object is determined to not be associated with one or more external objects by a "mild" reference (504), the process of FIG. 5 ends. For an object that has been determined to not be reachable locally (502) (e.g., in various embodiments no explicit/strong reference from a root object or another reachable from a root object and/or no traditional external references and/or other locally enlivening references), it is determined whether the object is associated with one or more external objects by a "mild" reference (508). If not, the object is garbage collected (512) and the process ends. If so, it is determined whether at least one external object with which the locally unreachable object has been determined to be associated has been marked as reachable within its own runtime system (or otherwise in use) (510). If so, the locally unreachable object (502) is retained and the process ends. Otherwise, the object is garbage collected (512) and the process ends. In some embodiments, the process of garbage collecting an object for which data associating the object with one or more external objects, none of which has been marked by its corresponding garbage collector as being reachable in its own local system (or otherwise in use), has been stored in a data structure such as table 402 includes removing from the data structure the data associating the object with the external object(s). In some embodiments, such entries are removed by a process associated with the table, upon such process determining, recognizing, and/or otherwise receiving an indication that none of the objects in a set was reached in its local domain.

Figure 6:
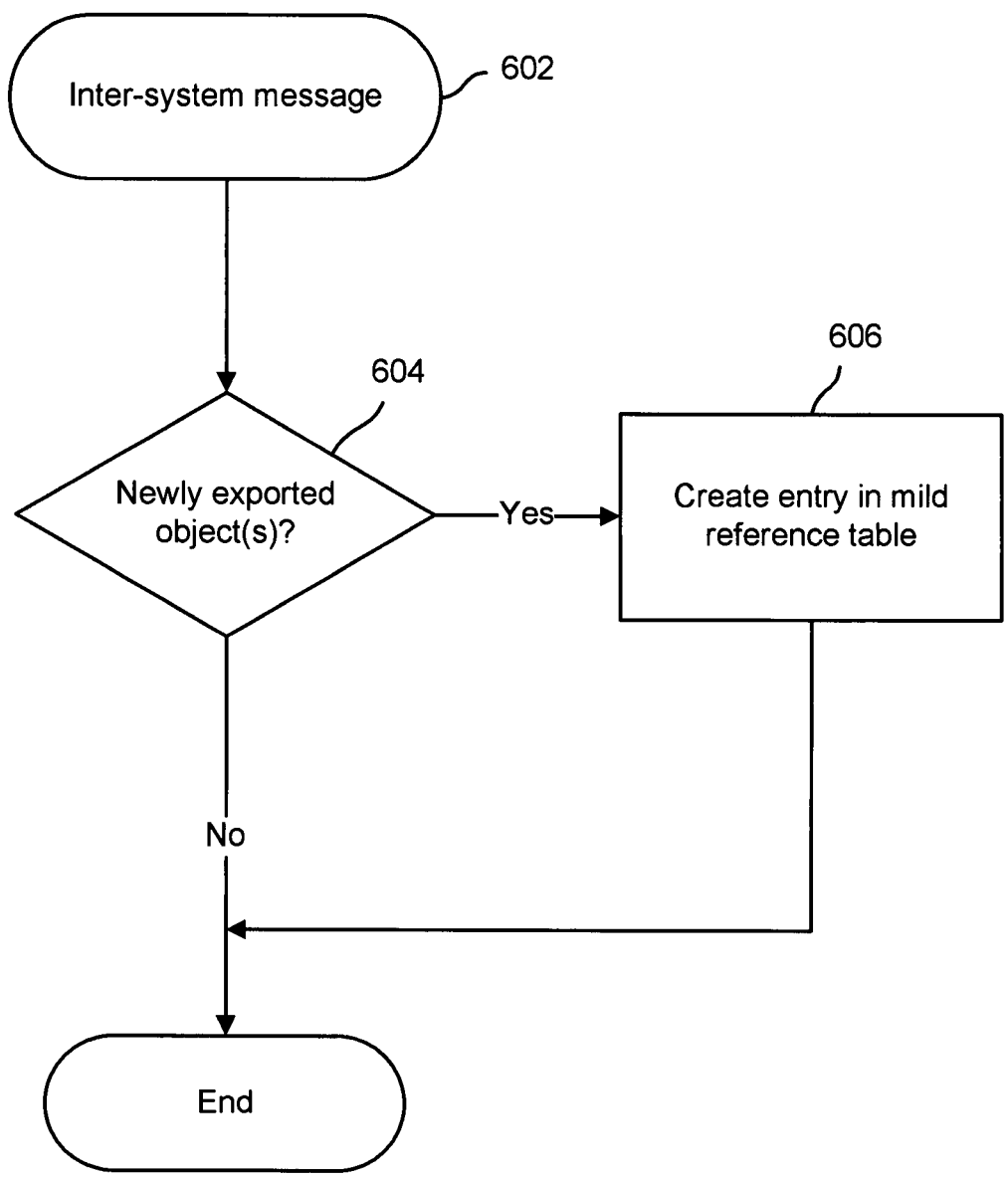
FIG. 6 is a flow chart illustrating an embodiment of a process for extended garbage collection based on an inter-runtime system message.

FIG. 6 is a flow chart illustrating an embodiment of a process for extended garbage collection based on an inter-runtime system message. In some embodiments, the process of FIG. 6 is implemented by each of one or more respective garbage collectors in a distributed environment. When an inter-runtime system message is sent (602), it is determined whether any object(s) is/are being newly exported (604). For example, a proxy object may have been newly created to send the message, e.g., to an object in another runtime system for which the sending object has been configured to serve as a proxy in the sending runtime environment, or an object that has not been exported previously may be referenced in the message. If an object is newly being exported (604), the local garbage collector creates in a mild reference table such as table 402 and/or another data structure an entry that indicates the object is associated with one or more external objects and marks the object as having been reached in its local runtime environment (606). Once the entry has been created (606) or if no object is newly exported by or in connection with the message (604), the process of FIG. 6 ends. In some embodiments, the process of FIG. 6 ensures that an object that is associated with an inter-runtime system message is retained.

Figure 7:
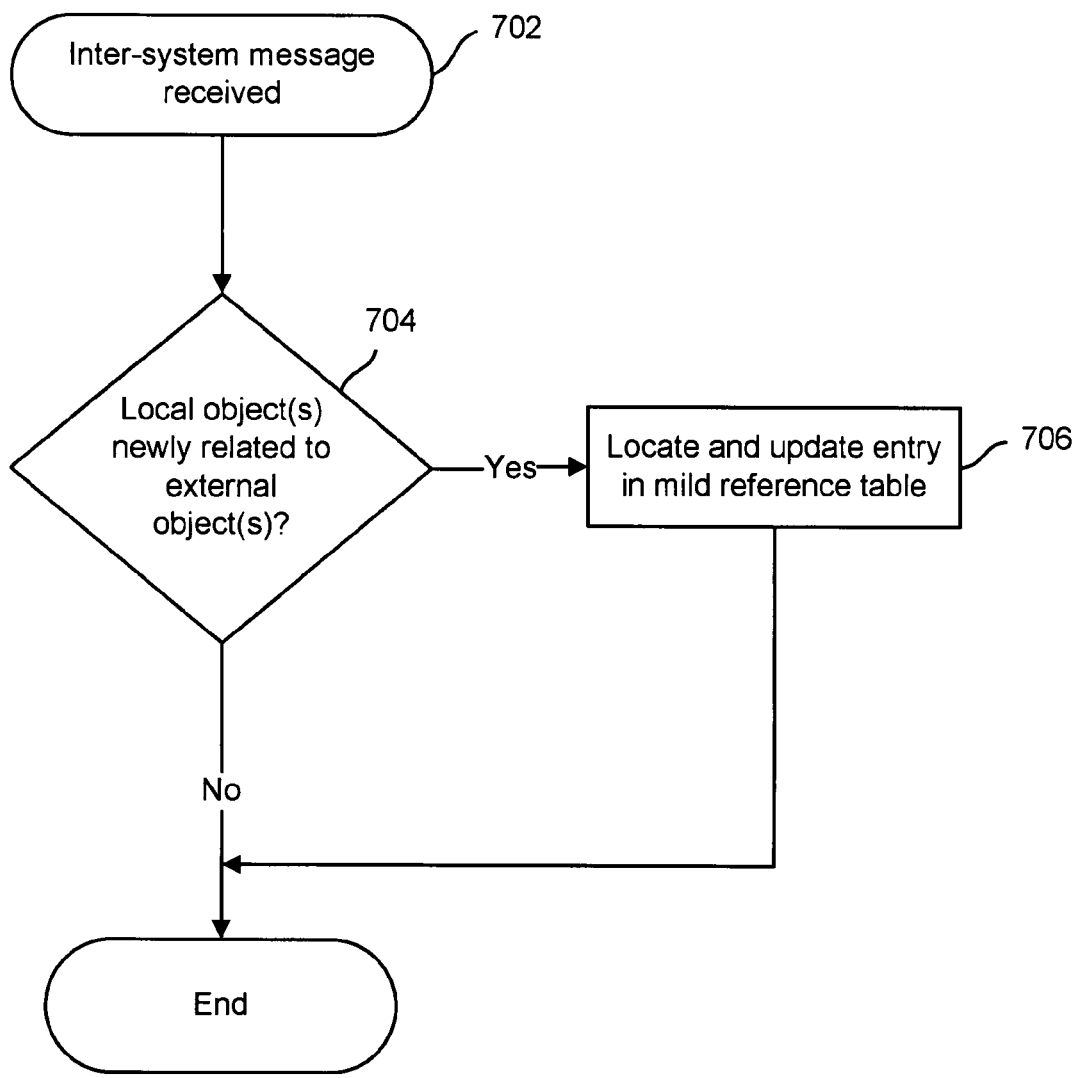
FIG. 7 is a flow chart illustrating an embodiment of a process for extended garbage collection based on an inter-runtime system message from the perspective of the receiving runtime system.

In a highly dynamic scripting language such as Ruby or JavaScript, for example, certain global variables from Objective-C may be "exported". In Java or Objective-C Distributed Objects, certain objects are advertised in a namespace or are registered with a TCP port. Clients synthesize a reference to the object at the other end of that port (or all objects in the name space). In the Ruby/JavaScript case, a proxy object is formed whose sole job is to forward JavaScript/Ruby "messages" (method calls) across the "bridge" and turn them into Objective-C method calls. These messages often include arguments that are objects in the JavaScript/Ruby world, or perhaps are proxies to other Objective-C objects that have been returned as a result of other messages. In some embodiments, when a message is sent from one runtime system to another, a table entry is synthesized for all objects being newly exported from the domain from which the message is being sent, e.g. using the process of FIG. 6, and the other side then extends the table with the id of the proxy object it forms to represent that object locally. FIG. 7 is a flow chart illustrating an embodiment of a process for extended garbage collection based on an inter-runtime system message from the perspective of the receiving runtime system. In some embodiments, the process of FIG. 7 is implemented by a garbage collector associated with such a receiving runtime system. Upon receiving an inter-runtime-system message (702), if any local object(s) is/are newly related to one or more external objects (704), e.g., a proxy object generated at the receiving runtime system as described above, then a corresponding entry is located in a "mild" references table, such as described above, and the entry is updated to include the id(s) of any local object(s) related to external objects already identified in the located entry (706). For example, as described above, in some embodiments a table entry created by the sending domain for an object that sent the inter-system message and/or a newly exported object referenced in the message is extended to include the id of a proxy object created by the receiving domain to represent the sending (or referenced) object in the receiving domain.

The techniques disclosed herein facilitate garbage collection in a distributed environment by providing a mechanism for garbage collectors to share data in a manner that enables each to determine reliably that a local object that has been in use externally is no longer required for such external use.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing memory, comprising:
   receiving an indication that a local object is associated with one or more external objects and storing in a shared data structure an entry indicating that the local object and said one or more external objects are associated with one another, wherein receiving an indication comprises receiving from an application code a call to a method or function configured to make, in response to the call, said entry indicating that the local object and said one or more external objects are associated with one another;
   determining that the local object local to a first runtime system is associated with said one or more external objects associated with a second runtime system, wherein the determination is based at least in part by a garbage collecting entity associated with the first runtime system reading data stored in the shared data structure, and the shared data structure is accessible by the garbage collecting entity associated with the first runtime system and a garbage collecting entity associated with the second runtime system;
   retaining the local object, even if the local object has been determined to be unreachable locally in the first runtime system, if at least one of said one or more external objects has been determined by the garbage collection entity associated with the first runtime system to be reachable within the second runtime system by reading from the shared data structure a data stored in the shared data structure by the garbage collecting entity associated with the second runtime system indicating that said at least one of said one or more external objects is reachable in said second runtime system; and
   deallocating the local object associated with said one or more external objects if the garbage collection entity associated with the first runtime system has determined, by reading from the shared data structure, that none of the external objects are reachable within said second runtime system,
   wherein said at least one of said one or more external objects is determined by the garbage collecting entity associated with the second runtime system to be reachable in said second runtime system if a reference exists from at least one other object to said at least one of said one or more external objects.

2. A method as recited in claim 1, wherein the determination that the local object is associated with one or more external objects is made by the garbage collecting entity associated with the first runtime system.

3. A method as recited in claim 1, wherein determining that the local object is associated with one or more external objects includes scanning the shared data structure for an entry associated with the local object.

4. A method as recited in claim 1, wherein the shared data structure accessible by the respective garbage collecting entity of each of a plurality of runtime systems comprises a table.

5. A method as recited in claim 1, wherein the local object and said one or more external objects comprise a distributed object.

6. A method as recited in claim 5, wherein the distributed object comprises a single component object in each of a plurality of runtime systems.

7. A method as recited in claim 1, further comprising determining that the local object is reachable within the first runtime system and entering in the shared data structure a data value that marks the local object as having been determined to be reachable within the first runtime system.

8. A method as recited in claim 1, further comprising receiving an indication that the local object has sent an inter-runtime system message to the at least one of said one or more external objects and entering in the shared data structure a data value that marks the at least one of said one or more external objects as having been determined to be in use.

9. A method as recited in claim 8, wherein the data value comprises a bit that is also used to mark an object as having been determined to be reachable within its runtime system.

10. A method as recited in claim 1, further comprising retaining one or more other local objects, that are determined to be reachable from the local object within the first runtime system.

11. A method as recited in claim 10, wherein said one or more other objects, are retained even if one or more of them have been determined to be otherwise not reachable within the first runtime system.

12. A method as recited in claim 1, wherein the reference exists if there is a reference from a root object within said second runtime environment to said at least one of said one or more external objects.

13. A method as recited in claim 1, wherein the reference exists if there is a reference from a root object within said second runtime environment to an intermediate object, and a reference from the intermediate object to said at least one of said one or more external objects.

14. A method as recited in claim 1, wherein the reference exists if there is a reference to said at least one of said one or more external objects from another object external to said second runtime environment.

15. A method of managing memory, comprising:
   receiving an indication that a local object is associated with one or more external objects and storing in a shared data structure an entry indicating that the local object and said one or more external objects are associated with one another, wherein receiving an indication comprises receiving from an application code a call to a method or function configured to make, in response to the call, said entry indicating that the local object and said one or more external objects are associated with one another;
   determining that the local object is not reachable within a local runtime system with which the local object is associated;
   retaining the local object if it is determined that the local object is associated with one or more external objects at least one of which has been determined to be reachable within an external runtime system with which it is associated,
   wherein the determination that the local object is associated with one or more external objects at least one of which has been determined to be reachable within an external runtime system with which it is associated is made at least in part by a local garbage collecting entity associated with the local runtime system reading from the shared data structure a data stored by an external garbage collecting entity associated with the external runtime system indicating that at least one of said one or more external objects has been determined by said external garbage collecting entity associated with said external runtime system to be reachable within said external runtime system, wherein the shared data structure is accessible by a plurality of garbage collecting entities, each associated with a corresponding runtime system, wherein the plurality of garbage collecting entities includes the local garbage collecting entity and the external garbage collecting entity; and deallocating the local object associated with said one or more external objects if the local garbage collecting has determined, by reading from the shared data structure, that none of said one or more external objects have been determined by said external garbage collecting entity to be reachable within said external runtime system, wherein said external garbage collecting entity is configured to determine that at least one of said one or more external objects is reachable within said external runtime system if a reference exists from at least one other object to said at least one of said one or more external objects.

16. A method as recited in claim 15, wherein the determination that the local object is associated with one or more external objects at least one of which has been determined to be reachable within an external runtime system with which it is associated or otherwise still in use is based at least in part on data stored in the shared data structure that is accessible by the respective garbage collecting entity of each of a plurality of runtime systems.

17. A method as recited in claim 15, further comprising garbage collecting the local object if it is determined that none of said one or more external objects has been determined to be reachable within an external runtime environment with which the external object is associated.

18. A computer system, comprising:
a memory comprising an address space a respective portion of which has been allocated for use as a memory heap by each of a plurality of runtime systems; and
a processor configured to provide each of said plurality of runtime systems, each runtime system including a corresponding garbage collection entity configured to:
receive an indication that a local object is associated with one or more external objects and storing in a shared data structure an entry indicating that the local object and said one or more external objects are associated with one another, wherein receiving an indication comprises receiving from an application code a call to a method or function configured to make, in response to the call, said entry indicating that the local object and said one or more external objects are associated with one another;
determine that the local object is not reachable within a local runtime system with which the local object is associated;
retain the local object if it is determined that the local object is associated with one or more external objects at least one of which has been determined to be reachable within an external runtime system with which it is associated;
wherein the processor is configured to determine that the local object is associated with one or more external objects at least one of which has been determined to be reachable within an external runtime system with which it is associated at least in part by a local garbage collecting entity associated with the local runtime system reading from the shared data structure a data stored by an external garbage collecting entity associated with the external runtime system indicating that at least one of said one or more external objects has been determined by said external garbage collecting entity associated with said external runtime system to be reachable within said external runtime system;

wherein the shared data structure is accessible by a plurality of garbage collecting entities, each associated with a corresponding runtime system, wherein the plurality of garbage collecting entities includes the local garbage collecting entity and the external garbage collecting entity; and deallocate the local object associated with said one or more external objects if the garbage collection entity associated with the first runtime system has determined, by reading from the shared data structure, that none of said one or more external objects are reachable within said external runtime system, wherein said at least one of said one or more external objects is determined to be reachable within said external runtime system if a reference exists from at least one other object to said at least one of said one or more external objects.

19. A computer system as recited in claim 18, wherein each garbage collection entity is configured to make, upon determining that the local object is reachable within the local runtime system, an entry in a shared data structure accessible to at least a subset of the garbage collection entities indicating that the local object was determined to be reachable.

20. A computer system as recited in claim 18, wherein each garbage collection entity is configured to make, upon determining that the local object is associated with one or more external objects, an entry in a shared data structure accessible to at least a subset of the garbage collection entities indicating that the local object is associated with said one or more external objects.

21. A computer system as recited in claim 18, wherein the garbage collection entity determines that the local object is associated with an external object if the garbage collection entity receives an indication that the local object has sent an inter-runtime system message to the external object.

22. A computer program product for managing memory, the computer program product being embodied in a non-transitory computer readable storage medium and comprising computer instructions which when executed by a computer cause the computer to perform a method comprising:
receiving an indication that a local object is associated with one or more external objects and storing in a shared data structure an entry indicating that the local object and said one or more external objects are associated with one another, wherein receiving an indication comprises receiving from an application code a call to a method or function configured to make, in response to the call, said entry indicating that the local object and said one or more external objects are associated with one another;
determining that the local object local to a first runtime system is associated with one or more external objects associated with a second runtime system, wherein the determination is based at least in part by a garbage collecting entity associated with the first runtime system reading data stored in the shared data structure; wherein the shared data structure is accessible by the garbage collecting entity associated with the first runtime system and a garbage collecting entity associated with the second runtime system;
retaining the local object, even if the local object has been determined to be unreachable locally in the first runtime system, if at least one of said one or more external objects has been determined by the garbage collection entity associated with the first runtime system to be reachable within the second runtime environment by reading from the shared data structure a data stored in the shared data structure by the garbage collecting entity associated with the second runtime system indicating that said at least one of said one or more external objects is reachable in said second runtime environment; and deallocating the local object associated with said one or more external objects if the garbage collection entity associated with the first runtime system has determined, by reading from the shared data structure, that none of said one or more external objects are reachable in said second runtime environment, wherein said at least one of said one or more external objects is determined to be reachable in said second runtime environment if a reference exists from at least one other object to said at least one of said one or more external objects.

* * * * *